(12) United States Patent
Sisler et al.

(10) Patent No.: US 7,279,506 B2
(45) Date of Patent: *Oct. 9, 2007

(54) INK JETTABLE OVERPRINT COMPOSITIONS

(75) Inventors: Gordon Sisler, St. Catharines (CA); Kurt I. Halfyard, Mississauga (CA); T. Brian McAneney, Burlington (CA); Peter G. Odell, Mississauga (CA); Chris Wagner, Etobicoke (CA)

(73) Assignee: Xerox Corporation, Stamford, CT (US)

( * ) Notice: Subject to any disclaimer, the term of this patent is extended or adjusted under 35 U.S.C. 154(b) by 373 days.

This patent is subject to a terminal disclaimer.

(21) Appl. No.: 10/838,212

(22) Filed: May 5, 2004

(65) Prior Publication Data

US 2005/0249895 A1 Nov. 10, 2005

(51) Int. Cl.
*C08F 2/50* (2006.01)
*C09D 11/02* (2006.01)
*B41M 5/00* (2006.01)

(52) U.S. Cl. .......................... 522/182; 522/96; 522/18; 522/178; 522/90; 430/124; 430/132; 106/31.13; 106/31.6; 106/31.85; 106/31.89; 427/508; 427/511; 427/514; 427/510; 428/32.1; 428/32.26; 428/32.31

(58) Field of Classification Search .................. 522/18, 522/90, 96, 182, 178; 430/124, 132; 427/508, 427/511, 514, 510; 106/31.13, 31.6, 31.85, 106/31.89; 428/32.1, 32.26, 32.31
See application file for complete search history.

(56) References Cited

U.S. PATENT DOCUMENTS

| | | | |
|---|---|---|---|
| 4,070,262 A | 1/1978 | Guarino et al. | |
| 4,071,425 A | 1/1978 | Guarino et al. | |
| 4,072,592 A | 2/1978 | Dué et al. | |
| 4,072,770 A | 2/1978 | Ting | |
| 4,133,909 A | 1/1979 | Spencer | |
| 4,265,976 A | 5/1981 | Nowak | |
| 4,303,924 A | 12/1981 | Young, Jr. | |
| 4,978,969 A | 12/1990 | Chieng | |
| 5,084,095 A | 1/1992 | Fritz | |
| 5,162,389 A | 11/1992 | Lee et al. | |
| 5,219,641 A | 6/1993 | Mehta et al. | |
| 5,232,812 A | 8/1993 | Morrison et al. | |
| 5,270,368 A | 12/1993 | Lent et al. | |
| 5,275,646 A | 1/1994 | Marshall et al. | |
| 5,623,001 A | 4/1997 | Figov | |
| 5,703,141 A * | 12/1997 | Jin | 522/97 |
| 5,800,884 A | 9/1998 | D'Anna et al. | |
| 5,905,012 A | 5/1999 | De Meutter et al. | |
| 6,114,406 A | 9/2000 | Caiger et al. | |
| 6,162,511 A * | 12/2000 | Garnett et al. | 427/514 |
| 6,276,792 B1 | 8/2001 | Gundlach et al. | |
| 6,352,805 B1 | 3/2002 | Taylor et al. | |
| 6,385,405 B1 | 5/2002 | Kingsland | |
| 6,424,364 B2 | 7/2002 | Gundlach et al. | |
| 6,610,388 B2 | 8/2003 | Xing et al. | |
| 2003/0203228 A1 | 10/2003 | Almog et al. | |

FOREIGN PATENT DOCUMENTS

| | | |
|---|---|---|
| EP | 0 823 670 A1 | 2/1998 |
| EP | 1 193 551 A2 | 4/2002 |
| EP | 1 193 551 A3 | 4/2002 |
| WO | WO 03/066761 A2 | 8/2003 |

\* cited by examiner

*Primary Examiner*—Sanza L. McClendon
(74) *Attorney, Agent, or Firm*—Oliff & Berridge, PLC

(57) ABSTRACT

Ink jettable, radiation curable overprint compositions containing at least one radiation curable oligomer/monomer, at least one photoinitiator, and at least one surfactant are disclosed. The overprint compositions are particularly well-suited for protecting ink-based and toner-based images on substrates subjected to abrasives, heat, and/or sunlight since the compositions protect such images from smearing, cracking, and fading.

16 Claims, 1 Drawing Sheet
(1 of 1 Drawing Sheet(s) Filed in Color)

INK JETTABLE OVERPRINT COMPOSITIONS

BACKGROUND OF THE INVENTION

1. Field of Invention

The present invention generally relates to ink jettable overprint compositions and their use in methods for protecting images on a substrate. The overprint compositions of the present invention provide a number of advantages to both ink-based and toner-based images, such as, for example, image permanence, thermal stability, lightfastness, and smear resistance.

2. Description of Related Art

In conventional xerography, electrostatic latent images are formed on a xerographic surface by uniformly charging a charge retentive surface, such as a photoreceptor. The charged area is then selectively dissipated in a pattern of activating radiation corresponding to the original image. The latent charge pattern remaining on the surface corresponds to the area not exposed by radiation. Next, the latent charge pattern is visualized by passing the photoreceptor past one or more developer housings comprising toner, which adheres to the charge pattern by electrostatic attraction. The developed image is then fixed to the imaging surface or is transferred to a receiving substrate, such as paper, to which it is fixed by a suitable fusing technique, resulting in a xerographic print or toner-based print.

Known methods of protecting toner-based images include adding wax to the toner and applying an overprint coating to the substrate. The overprint coating, often referred to as an overprint varnish or composition, is typically a liquid film coating that may be dried and/or cured. Curing may be accomplished through drying or heating or by applying ultraviolet light or low voltage electron beams to polymerize (crosslink) the components of the overcoat. However, known overprint coatings, such as those described in U.S. Pat. Nos. 4,070,262, 4,071,425, 4,072,592, 4,072,770, 4,133,909, 5,162,389, 5,800,884, 4,265,976, and 5,219,641, for example, fail to adequately protect toner-based prints and do not possess the requisite properties for controlled application, such as, for example, by an ink jet printer.

Typically, known coating formulations are applied using a liquid film coating device, and thus are often applied over the entire surface of the image, i.e., flood coating. Applying a composition to part of an image, i.e., spot coating, is possible, but it requires preparing a plate or cylinder prior to application of the overprint composition. Thus, applying known coating formulations can be inefficient, difficult, and time-consuming and is not desirable for integration with variable-data digital printing.

Coating formulations for ink-based images are also known. For example, UV curable ink-jet inks have been used in an attempt to overcome the failure of ink jet-generated images to withstand heat and sunlight. Typically, such UV curable ink-jet inks include polymerizable monomers, oligomers, or a mixture thereof along with a dye or pigment for color. However, these ink-jet inks often contain relatively large amounts of toxic solvent or water, as described in U.S. Pat. Nos. 4,978,969 and 5,623,001, respectively, or other toxic components, such as the varnish described in U.S. Pat. No. 5,270,368, or require specific, impractical conditions, such as, the varnish described in U.S. Pat. No. 4,303,924.

Accordingly, a need exists for an ink jettable protective composition that provides overprint coating properties including, but not limited to, thermal and light stability and smear resistance to toner-based images and ink-based images, particularly in commercial print applications. More specifically, a need exists for an overprint coating that has a low viscosity (to enable ink jetting), yet is stable at the generally high temperature required for ink jetting and achieves the desired properties, including, but not limited to, the ability to wet over silicone fuser oil (generally found on xerographic substrates), permit overwriting, reduce or prevent thermal cracking in response to thermal expansion of the toner, and protect an image from sun, heat, etc. The compositions and processes of the present invention, wherein a toner-based or ink-based image and/or substrate thereof is coated with an ink jettable, radiation curable overprint composition, satisfies this need.

SUMMARY OF THE INVENTION

The present invention is directed to compositions and methods for protecting images by providing, for example, improved quality and durability, a high degree of smear resistance, and thermal and light stability. Such images can be generated by forming an ink-based image or toner-based image on a substrate and treating the image with a solvent-free, ink jettable, radiation curable overprint composition comprising at least one radiation curable oligomer/monomer, at least one photoinitiator, and at least one surfactant. The protected image is more permanent and durable, able to resist cracking and fading, and is capable of accepting overwriting in the absence of smearing.

The present invention further provides image processing methods comprising: generating an ink-based or toner-based image on a substrate; depositing an overprint composition onto the substrate as a whole, onto the image as a whole, or onto part(s) of the substrate and/or image; and curing the overprint composition. Thus, in embodiments of the present invention, the overprint composition can be deposited to completely cover the substrate or image thereon or selectively deposited to cover the image, part(s) of the image, part(s) of the substrate, and/or any combination thereof.

The composition can be applied to the substrate in a digital fashion and is suitable for in-line applications when combined with xerographic techniques. When coated onto xerographic prints, the overprint compositions have the additional advantage of reducing or eliminating document offset at temperatures up to about 70-100° C., reducing or eliminating the occurrence of toner cracking, reducing or eliminating mass dependent differential gloss between toner pile heights on color images, and increasing overall gloss at any given toner pile height of the image. Overall appearance of the print is improved by the composition due to the composition's ability to fill in the roughness of the substrate and toner, thereby forming a level film, which enhances glossiness. The combination of ink jet technology and xerography is described in, for example, U.S. Pat. No. 5,232,812, which is incorporated herein by reference in its entirety.

The invention further provides to toner-based and ink-based prints comprising an ultraviolet (UV) curable overprint composition applied to at least one surface of the print, preferably, applied to the top of the substrate and/or the fused-toner image. The UV curable composition comprises a homogeneous mixture of UV curable oligomers, monomers, photoinitiators, and surfactants. By coating a print with the inventive composition, the toner or ink is effectively buried beneath an overcoat, which essentially forms a protective barrier on the print.

BRIEF DESCRIPTION OF THE DRAWINGS

The patent or application file contains one drawing executed in color. Copies of this patent or patent application publication with the color drawing will be provided by the U.S. patent and Trademark Office upon request and payment of the necessary fee.

DETAILED DESCRIPTION OF PREFERRED EMBODIMENTS

Figure 1:
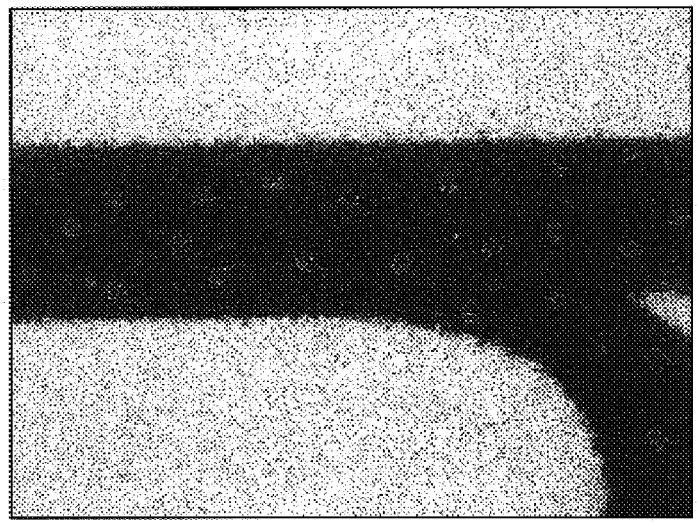
FIG. 1 is a photograph of the letter "r" in black ink coated with the inventive overprint composition of Example 1.

The present invention provides solvent-free, ink jettable, image protecting compositions comprising radiation curable overprint compositions especially adapted for ink jet printers. The compositions comprise at least one radiation curable oligomer/monomer, at least one photoinitiator, and at least one surfactant.

In the uncured state, the composition is preferably a low viscous liquid and is readily jettable. Upon exposure to a suitable source of curing energy, e.g., ultraviolet light, electron beam energy, etc., the photoinitiator absorbs the energy and sets into motion a reaction that converts the liquid composition into a cured protective overcoat. The monomer and oligomer in the composition contain functional groups that polymerize during exposure to the curing source to readily crosslink forming a polymer network. This polymer network provides printed images with, for example, durability, thermal and light stability, and smear resistance. Thus, the composition is particularly well-suited for coating ink-based images and toner-based images on substrates subjected to heat and sunlight since the composition protects the image from cracking and fading, provides image permanence, and allows for overwriting in the absence of smearing and beading.

Another advantage of the overprint compositions is its ability to protect xerographic prints from electron beam irradiation, such as the type of irradiation used on certain mail addressed to particular United States governmental agencies to kill bacteria and viruses. Very high irradiation levels are required at temperatures of about 95-110° C., causing visible steaming. Thus, irradiated mail is often yellow and paper is often brittle. Compact disks, floppy disks, and other plastics melt and do not survive the irradiation process. In addition, most toner-based documents suffer from document offset, and thus stick together, after irradiation. The overprint compositions allow such documents to survive irradiation intact.

Overprint Compositions

The overprint compositions comprise, in general, at least one radiation curable oligomer/monomer, at least one photoinitiator, and at least one surfactant. More specifically, the overprint compositions comprise at least one acrylated oligomer, polyether, or polyester acrylate, such as, for example, a high molecular weight, low viscosity, unsaturated trifunctional acrylic resin; at least one low surface tension, low viscosity di- or tri-functional acrylate monomer; at least one UV-photoinitiator used to initiate the photopolymerization, i.e., curing, of the chemically unsaturated prepolymer (oligomer and monomer); and at least one surfactant.

The oligomer component of the composition is preferably relatively hydrophobic. Such oligomers help provide the radiation-cured layer of the print with the requisite moisture barrier properties because, as the hydrophobicity of the oligomer increases, the moisture barrier properties improve. As a result, moisture is less likely to permeate into the base paper, which minimizes paper cockling and curling. Suitable acrylated oligomers include, but are not limited to, acrylated polyesters, acrylated polyethers, acrylated epoxys, and urethane acrylates having a low viscosity, e.g., not exceeding about 0.5 Pa.s at 23° C. Preferred oligomers include, but are not limited to, polyether acrylate oligomers, having the basic structure:

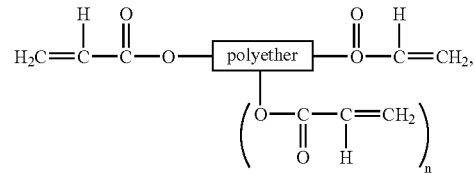

such as, for example, Laromer® PO94F (BASF Corp., Charlotte, N.C.), an amine-modified polyether acrylate oligomer.

The monomer functions as a viscosity reducer, as a binder when the composition is cured, as an adhesion promoter, and as a crosslinking agent, for example. Suitable monomers have a low molecular weight, low viscosity, and low surface tension and comprise functional groups that undergo polymerization upon exposure to UV light. The monomers are preferably polyfunctional alkoxylated, or polyalkoxylated, acrylic monomers comprising one or more di- or tri-acrylates. Suitable polyfunctional alkoxylated or polyalkoxylated acrylates are, for example, alkoxylated, preferably, ethoxylated, or propoxylated, variants of the following: neopentyl glycol diacrylates, butanediol diacrylates, trimethylolpropane triacrylates, and glyceryl triacrylates. In the most preferred embodiment, the monomer is a propoxylated$_2$ neopentyl glycol diacrylate, such as, for example, SR-9003 (Sartomer Co., Inc., Exton, Pa.), having the structure:

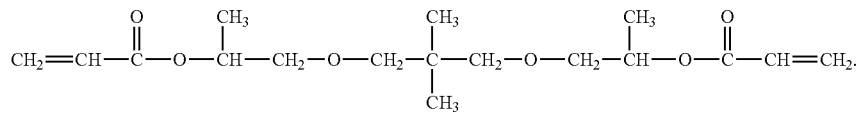

Suitable photoinitiators are UV-photoinitiators including, but not limited to, hydroxycyclohexylphenyl ketones, benzoins, benzoin alkyl ethers, benzophenones, trimethylbenzoylphenylphosphine oxides, azo compounds, anthraquinones and substituted anthraquinones, such as, for example, alkyl substituted or halo substituted anthraquinones, other substituted or unsubstituted polynuclear quinones, acetophones, thioxanthones, ketals, acylphosphines, and mixtures thereof. More preferably, the photoinitiator is one of the following compounds or a mixture thereof: a hydroxycyclohexylphenyl ketone, such as, for example, 1-hydroxycyclohexylphenyl ketone, such as, for example, Irgacure® 184 (Ciba-Geigy Corp., Tarrytown, N.Y.), having the structure:

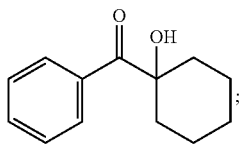

a trimethylbenzoylphenylphosphine oxide, such as, for example, ethyl-2,4,6-trimethylbenzoylphenylphosphinate, such as, for example, Lucirin® TPO-L (BASF Corp.), having the formula

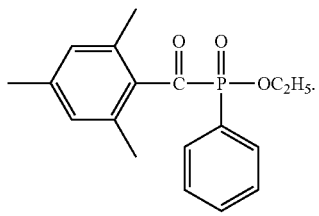

The fourth main ingredient, the surfactant, is generally used to lower the surface tension of the composition to allow wetting and leveling of the substrate surface, if necessary, before curing. Any surfactant that has this capability may be used. Preferred surfactants include, but are not limited to, fluorinated alkyl esters, polyether modified polydimethylsiloxanes, having the structure:

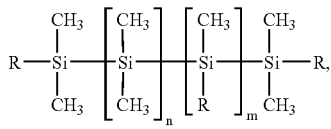

wherein the R groups are functional modifications, such as, for example, BYK®-UV3510 (BYK Chemie GmbH, Wesel, Germany), and BYK®-348 (BYK Chemie GmbH), and fluorosurfactants, such as, for example, Zonyl® FSO-100 (E.I. Du Pont de Nemours and Co., Wilmington, Del.), having the formula $RfCH_2CH_2O(CH_2CH_2O)xH$, wherein $Rf=F(CF_2CF_2)y$, $x=0$ to about 15, and $y=1$ to about 7.

Optional additives include, but are not limited to, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, pigments and dyes, and the like. The composition can also include an inhibitor, preferably, a hydroquinone, to stabilize the composition by prohibiting or, at least, delaying, polymerization of the oligomer and monomer components during storage, thus increasing the shelf life of the composition. However, additives may negatively effect cure rate, and thus care must be taken when formulating an overprint composition using optional additives.

The ability of the composition to wet the substrate generally depends on its surface tension and viscosity. For example, if the surface tension is low, then the surface area covered by the composition will be high resulting in sufficient wetting of the substrate. Preferred composition formulations have a surface tension ranging from about 20 dynes/cm to about 50 dynes/cm, more preferably, ranging from about 20 dynes/cm to about 40 dynes/cm, and, most preferably, ranging from about 20 dynes/cm to about 30 dynes/cm, at about 40° C. to about 70° C.

The viscosity of the compositions ranges from about 30 cP to about 2.0 cP, depending on the temperature. Preferably, the viscosity of the compositions is about 2.0 cP at about 140° C., about 10 cP at about 50° C., and about 26 cP at about 25° C. The preferred range is about 15 cP to about 8.0 cP at a temperature range of about 40° C. to about 70° C. To obtain an acceptable viscosity to allow jetting, the preferred oligomer:monomer ratio is about 1:4.

The composition components are preferably mixed together in the following order: about 10 to about 30% oligomer including, but not limited to, a polyether acrylate oligomer, such as, for example, Laromer® PO43F (BASF Corp.) in a concentration of about 19%; about 70 to about 90% monomer including, but not limited to, a propoxylated$_2$ neopentyl glycol diacrylate, such as, for example, SR-9003 (Sartomer Co., Inc.) in a concentration of about 76%; about 2.0 to about 7.0% UV-photoinitiator including, but not limited to, 1-hydroxyclyclohexylphenyl ketone, such as, for example, Irgacure® 184 (Ciba-Geigy Corp.) in a concentration of about 4.8%; and about 0.05 to about 5.0% surfactant, more preferably, 0.1 to about 1.0% surfactant, including, but not limited to, a polyether modified polydimethylsiloxane, such as, for example, BYK®-UV3510 (BYK Chemie GmbH) in a concentration of about 0.2%. The components are combined and mixed with brief agitation using, preferably, a magnetic stir-bar or overhead mixer between each addition, followed by a minimum of about two hours of stirring until the oligomer is dissolved.

Overprint Composition Application Methods

The overprint compositions of the present invention can be used in image processing comprising: generating an ink-based or toner-based image on a substrate; ink jetting the overprint composition onto the substrate as a whole, onto the image as a whole, onto part(s) of the image, onto part(s) of the substrate, or any combination thereof; and curing the overprint composition. Thus, the composition is applied and cured only where needed.

When the composition is coated onto an image, parts thereof, substrate, and/or parts thereof, it can be applied at different levels of resolution. For example, the composition can be applied at the resolution of the print halftone dot, at the resolution of distinct part(s) of the image, or at a little less resolution than distinct part(s) of the image, allowing for some overlap of the composition onto nonimage areas of the substrate. The typical composition deposition level is about 0.5 to about 10 grams/square meter (gsm). The composition can be applied in at least one pass over the image at any stage in the image formation using any known ink jet printing technique, such as, for example, drop-on-demand ink jet printing including, but not limited to, piezoelectric and thermal ink jet printing. The application of the composition can be controlled with the same information used to form the image such that only one digital file is needed to produce the image and the overprint composition. Thus, the overprint composition is fully digital.

When coating a toner-based image, the fused toner-based print is obtained first and then subjected to an ink jet printer containing the jettable overprint composition. The toner-based print can be prepared by any suitable conventional xerographic technique or variant thereof.

Similarly, when coating an ink-based image, the ink-based image is generated first and then subjected to an ink jet printer containing the jettable overprint composition. If the ink-based image is formed using an ink jet printer, then the ink-based image can be subjected to a separate ink jet printer containing the jettable overprint composition or the ink jet ink can be housed in the same ink jet printer as the composition, whereby the composition is coated onto the substrate and/or image as a, preferably, colorless, transparent fluid after the ink jet ink image is formed. When the overprint composition is coated over an ink-based image, particularly, an image produced using an ink jet printer, the image can be prepared by any suitable conventional process or variant thereof.

The substrate employed can be any appropriate substrate depending upon the end use of the print. Exemplary substrates include, but are not limited to, plain paper, coated paper, transparency materials, plastics, polymeric films, treated cellulosics, wood, xerographic substrates, which may contain a residue of fuser-oil (functionalized silicone oil), and mixtures thereof, optionally comprising additives coated thereon. The optional additives include, but are not limited to, anti-curl compounds, such as, for example, trimethylolpropane; ink gellation agents, such as, for example, gum additives including, but not limited to, xanthan gum, agar, guar, and lecithin; biocides; humectants; chelating agents; and mixtures thereof; and any other optional additives well known in the ink art or xerographic art for enhancing the performance and/or value of the ink, toner, and/or substrate.

The energy source used to initiate crosslinking of the radiation curable oligomer and monomer components of the composition can be actinic, e.g., radiation having a wavelength in the ultraviolet or visible region of the spectrum, accelerated particles, e.g., electron beam radiation, thermal, e.g., heat or infrared radiation, or the like. Preferably, the energy is actinic radiation because such energy provides excellent control over the initiation and rate of crosslinking. Suitable sources of actinic radiation include, but are not limited to, mercury lamps, xenon lamps, carbon arc lamps, tungsten filament lamps, lasers, sunlight, and the like.

Ultraviolet radiation, especially from a medium pressure mercury lamp with a high speed conveyor under UV light, e.g., about 20 to about 70 m/min., is preferred, wherein the UV radiation is provided at a wavelength of about 200 to about 500 nm for about less than one second. More preferably, the speed of the high speed conveyor is about 15 to about 35 m/min. under UV light at a wavelength of about 200 to about 450 nm for about 10 to about 50 milliseconds (ms). The emission spectrum of the UV light source generally overlaps the absorption spectrum of the UV-initiator. Optional curing equipment includes, but is not limited to, a reflector to focus or diffuse the UV light, and a cooling system to remove heat from the UV light source.

The invention will be illustrated further in the following nonlimiting Examples. The Examples are intended to be illustrative only. The invention is not intended to be limited to the materials, conditions, process parameters, and the like, recited herein. Parts and percentages are by weight unless otherwise indicated.

EXAMPLES

Example 1

Jetting in a Modified Phaser® 860 Printhead (Xerox Corp.)

The components of the overprint composition were combined in the following order with brief agitation between each addition with an overhead mixer: about 19% Laromer® PO43F (BASF Corp.), about 76% SR-9003 (Sartomer Co., Inc.), about 4.8% Irgacure® 184 (Ciba-Geigy Corp.), and about 0.2% BYK®-UV3510 (BYK Chemie GmbH). The mixture was stirred at room temperature for about four hours at high shear with an overhead mixer until the oligomer dissolved and then jetted in a modified Phaser® 860 (Xerox Corp.) printhead in both a 100% coverage and in various halftone screens. The printhead was modified to allow jetting at temperatures ranging from about 40 to about 60° C. UV curing was done in a lab UV-lamp unit off-line using commercial specifications of a D lamp spectrum for 20 ms.

Example 2

Xerographic Prints

Figure 2:
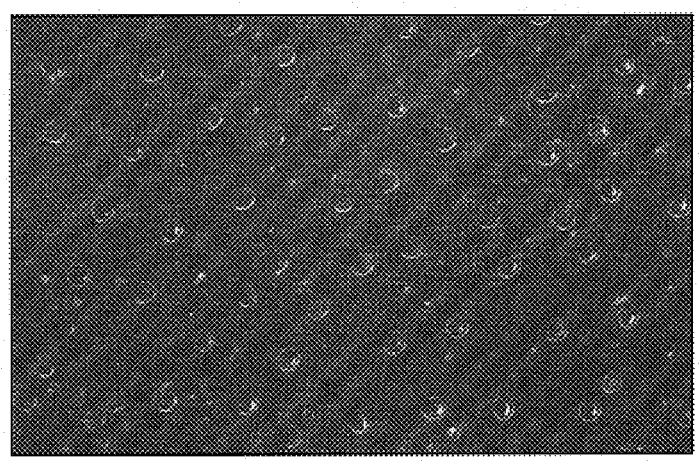
FIG. 2 is a photograph of a solid cyan-colored image coated with the inventive overprint composition of Example 1.

The overprint composition of Example 1 was applied to xerographic prints made on a DC12 (Docucolor® 12 printer (Xerox Corp.)) using FC11 toner (a conventional polyester color toner from Fuji Xerox Corp.) with an amino-silicone fuser oil layer on top of the prints. Initially, paper was taped to a transfix drum to simulate a direct-to-paper print mode. FIGS. 1 and 2 are photographs showing 10% screens of toner-based images coated with the overprint composition after curing. In FIG. 1, the letter "r" in black ink is coated with the overprint composition. In FIG. 2, a solid cyan image is coated with the overprint composition.

While the invention has been described with reference to the specific embodiments, it will be apparent to those skilled in the art that many alternatives, modifications, and variations can be made. It is intended to embrace such alternatives, modifications, and variations as may fall within the spirit and scope of the appended claims.

All the patents, publications, and articles referred to herein are hereby incorporated by reference in their entirety.

What is claimed is:

1. An overprint composition capable of being ink-jetted, comprising:
   a radiation curable oligomer selected from the group consisting of unsaturated acrylate resins having a viscosity of less than about 0.5 Pa.s at 23° C.;
   a radiation curable monomer selected from polyfunctional alkoxylated, or polyalkoxylated, acrylic monomers comprising one or more di- or tri-acrylates;
   at least one photoinitiator; and
   at least one surfactant,
   wherein the overprint composition has a viscosity ranging from about 15 cP to about 8 cP at a temperature ranging from about 40° C. to about 70° C. and a surface tension ranging from about 20 to about 30 dynes/cm at about 40° C. to about 70° C.;
   and wherein the oligomer:monomer ratio is about 1:4.

2. The ink jettable overprint composition of claim 1, wherein the surfactant is a polyether modified polydimethylsiloxane or a fluorosurfactant.

3. The ink jettable overprint composition of claim 1, wherein the photoinitiator is selected from the group consisting of hydroxycyclohexylphenyl ketones, trimethylbenzophenones, polymeric hydroxy ketones, trimethylbenzoylphenylphosphine oxides, and mixtures thereof.

4. The ink jettable overprint composition of claim 3, wherein the photoinitiator is 1-hydroxycyclohexylphenyl ketone.

5. The ink jettable overprint composition of claim 3, wherein the photoinitiator is a mixture of 1-hydroxycyclohexylphenyl ketone and ethyl-2,4,6-trimethylbenzoylphenylphosphinate.

6. The ink jettable overprint composition of claim 1, wherein the monomer is selected from the group consisting of neopentyl glycol diacrylates, butanediol diacrylates, trimethyloipropane triacrylates, and glyceryl triacrylates.

7. The ink jettable overprint composition of claim 6, wherein the monomer is a propoxylated$_2$ neopentyl glycol diacrylate.

8. The ink jettable overprint composition of claim 1, wherein the oligomer is a polyether acrylate oligomer.

9. A method of ink jet printing, comprising:
providing a composition capable of being ink-jetted;
ink jetting the overprint composition onto a substrate having an image thereon; and
exposing the image to a radiation source for sufficient time to at least substantially cure the radiation curable components of the overprint composition,
wherein the overprint composition comprises a radiation curable oligomer selected from the group consisting of unsaturated acrylate resins having a viscosity of less than about 0.5 Pa.s at 23° C.;
a radiation curable monomer selected from polyfunctional alkoxylated, or polyalkoxylated, acrylic monomers comprising one or more di- or tri-acrylates;
at least one photoinitiator; and
at least one surfactant,
wherein the overprint composition has a viscosity ranging from about 15 cP to about 8 cP at a temperature ranging from about 40° C. to about 70° C. and a surface tension ranging from about 20 to about 30 dynes/cm at about 40° C. to about 70° C.;
and wherein the oligomer:monomer ratio is about 1:4.

10. The method of claim 9, wherein the image is toner-based.

11. The method of claim 9, wherein the radiation source is an ultraviolet light.

12. The method of claim 9, wherein the ink jet is a thermal ink jet printer or a piezoelectric ink jet printer.

13. A method for providing thermal stability to a toner-based or an ink-based image, comprising:
obtaining a toner-based or an ink-based image on a substrate;
supplying an ink jet printer with a radiation curable overprint composition capable of being ink-jetted comprising about 10 to about 30% of a polyether acrylate oligomer having a viscosity of less than about 0.5 Pa.s at 23° C., about 70 to about 90% of a propoxylated$_2$ neopentyl glycol diacrylate, about 2.0 to about 7.0% of a ultraviolet light photoinitiator, and about 0.1 to about 1.0% of a surfactant, wherein the oligomer:monomer ratio is about 1:4;
delivering the overprint composition from the ink jet printer to the substrate; and
applying an ultraviolet light source to the substrate with the overprint composition thereon in an amount sufficient to cure the monomer and oligomer components of the composition.

14. The method of claim 13, wherein the overprint composition has a viscosity ranging from about 15 cP to about 8 cP at a temperature ranging from about 40° C. to about 70° C., and a surface tension ranging from about 20 to about 30 dynes/cm at about 40° C.

15. The method of claim 13, wherein the ink jet is a thermal ink jet printer or a piezoelectric ink jet printer.

16. A toner-based or ink-based print, comprising a substrate with a toner-based or ink-based image thereon coated with the overprint composition of claim 1, wherein, upon curing, the toner or ink on the printer resists smearing upon overwriting.

* * * * *